United States Patent Office 3,481,940
Patented Dec. 2, 1969

3,481,940
ESTERS OF SUBSTITUTED ACETOHYDROXAMIC ACIDS WITH TERTIARY AMINO ALCOHOLS
Joseph Levy, Paramus, N.J., assignor to Universal Oil Products Company, Des Plaines, Ill., a corporation of Delaware
No Drawing. Filed Sept. 6, 1966, Ser. No. 577,165
Int. Cl. C07c *103/30;* C07d *27/02*
U.S. Cl. 260—294   6 Claims

ABSTRACT OF THE DISCLOSURE

Di-(loweralkyl)-aminoalkyl esters and N-heterocyclic-substituted alkyl esters of dicycloalkyl-substituted or arylcycloalkyl-substituted acetohydroxamic acids, exemplified by 2-diethylaminoethyl dicyclohexylacetohydroxamate and 2-(N-methylpiperidyl-2) ethyl dicyclohexylacetohydroxamate. The compounds are useful as antispasmodic and anticholinergic agents.

---

This invention relates to novel compositions of matter comprising hydroxamate esters. More particularly, the invention is concerned with nitrogen-substituted esters of dicycloalkyl and arylcycloalkyl hydroxamic acids, the acid and quaternary salts thereof, and to methods for the preparation of said compounds.

Novel compositions of matter of the type hereinafter set forth in greater detail such as nitrogen-substituted alkyl esters or nitrogen containing heterocyclic-substituted alkyl esters of dicycloalkyl and arylcycloalkyl-substituted acetohydroxamic acids are useful compounds in the medical field, particularly as anti-spasmodic and anticholinergic drugs.

It is therefore an object of this invention to prepare dicycloalkyl - substituted and arylcycloalkyl - substituted acetohydroxamate esters which may be utilized as therapeutic agents.

A further object of this invention is to prepare nitrogen-containing esters of dicycloalkyl and arylcycloalkyl-substituted acetohydroxamic acids which may be utilized as therapeutic agents.

In one aspect, an embodiment of this invention resides in a compound of the class consisting of a free base, its addition salts with non-toxic acids and lower alkyl quaternary salts thereof, said free base having the generic formula:

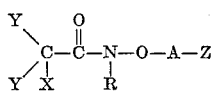

in which Y is selected from the group consisting of aryl and cycloalkyl radicals, at least one Y being a cycloalkyl radical, X is selected from the group consisting of hydrogen and hydroxyl, R is selected from the group consisting of hydrogen and lower alkyl of from 1 to about 5 carbon atoms, A is alkylene of from 2 to about 5 carbon atoms and Z is selected from the group consisting of di-(lower alkyl)-amino, piperidino, pyrrolidino, morpholino, piperidyl and pyrrolidyl radicals.

A specific embodiment of this invention is found in 2 - diethylaminoethyl α - hydroxycyclopentylphenylacetohydroxamate.

Other objects and embodiments will be found in the following further detailed description of this invention.

As hereinbefore set forth, the present invention is concerned with novel compositions of matter, the free base of which possesses the generic formula:

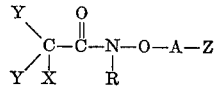

in which Y is selected from the group consisting of aryl and cycloalkyl radicals, at least one Y being a cycloalkyl radical, X is selected from the group consisting of hydrogen and hydroxyl, R is selected from the group consisting of hydrogen and lower alkyl of from 1 to about 5 carbon atoms, A is alkylene of from 2 to about 5 carbon atoms and Z is selected from the group consisting of di-(lower alkyl)-amino, piperidino, pyrrolidino, morpholino, piperidyl and pyrrolidyl radicals. In addition, the term "aryl radical" as used herein will refer to alkylphenyl, halophenyl and alkoxyphenyl radicals. The free base of the above formula may be conveniently prepared by reacting a substituted acetohydroxamic acid having the generic formula:

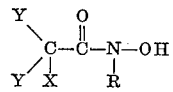

in which the Y, R and X radicals have the same meaning as hereinbefore set forth, with a nitrogen-substituted alkyl halide having the generic formula:

in which A and Z radicals have the same meaning as hereinbefore set forth and Hal is a halogen having an atomic weight of from 35 to 80 (i.e., chlorine or bromine (and preferably chlorine, since the chlorine-containing compounds are more readily available, in the presence of an alkaline substance.

Examples of the dicycloalkyl or arylcycloalkyl - substituted acetohydroxamic acids which may be used in the process of this invention include dicyclopentylacetohydroxamic acid, dicyclohexylacetohydroxamic acid, α-hydroxy dicyclohexylacetohydroxamic acid, α-hydroxy cyclopentylphenylacetohydroxamic acid, cyclopentylphenylacetohydoxamic acid, cyclohexylphenylacetohyddroxamic acid, α-hydroxycyclohexylphenylacetohydroxamic acid, cyclohexyl - p - tolylacetohydroxamic acid, cyclohexyl-p-methoxyphenylacetohydroxamic acid, cyclopentyl-p-chlorophenylacetohydroxamic acid, etc.

Examples of substituted nitrogen containing alkyl halides which may be used to prepare the compounds of this invention and which fall within the generic formula hereinbefore set forth include 2-chloro-N,N-dimethylethylamine, 2-bromo-N,N-dimethylethylamine, 2 - chloro-N,N-diethylethylamine, 2-chloro-N,N-dipropylethylamine, 3-chloro-N,N-dimethylpropylamine, 2-chloro - N,N - dimethylisopropylamine, 2-chloro - N,N - diethylisopropylamine, 2-chloro-1(N-methylpiperidyl-2)ethane, 2-chlor - 1 - piperidinoethane, 2-chlor-1-pyrrolidinoethane, 2 - chlor-1-morpholinoethane, 3-chlor - 1 - piperidinopropane, 3-chlor-1-pyrrolidinopropane, etc. It is to be understood that the aforementioned compounds are only representative of the class of compounds which may be used, and that the present process is not necessarily limited thereto.

One method of preparation of the desired products which comprise novel compositions of matter involves the reaction of a substituted acetohydroxamic acid of the type hereinbefore set forth with a substituted amino alkyl halide also hereinbefore set forth in the presence of an alkaline substance. In a proper method of preparing the compounds of this invention, the substituted acetohydroxamic acid is treated with the alkaline substance whereby the alkaline metal or alkaline earth metal salt of the substituted acetohydroxamic acid is formed. Following this, the substituted amino alkyl halide is added and the reaction is allowed to proceed. The reaction may be effected in the presence of water or an alcohol such as methyl alcohol, ethyl alcohol, propyl alcohol, isopropyl alcohol, etc. Alternatively, the desired products of the present invention may be obtained by reacting a previously formed alkali metal, or alkaline earth metal salt of a substituted acetohydroxamic acid with the substituted amino alkyl halide in an anhydrous, inert liquid reaction medium such as dimethylformamide, dimethylsulfoxide, tetrahydrofuran, dimethoxyethane, benzene, toluene, xylene or n-heptane, etc. Alkaline substances which may be utilized to prepare the alkali metal or alkaline earth metal salts include potassium hydroxide, sodium hydroxide, lithium hydroxide, barium hydroxide, sodium methylate, sodium ethylate, sodamide, lithium amide, potassium amide or sodium hydride. Approximately equimolar amounts of the reactants may be used, or, if so desired, an excess of the substituted amino alkyl halide can be added. The reaction proceeds at ambient temperature (about 25° C.) although elevated temperatures up to the reflux temperatures of the solvent employed may be used to increase the reaction rate. After the reaction is completed, the product comprising the novel composition of matter may be isolated by conventional means such as extraction and crystallization, or by taking advantage of the relative acidic and basic properties of the materials present to achieve separation and purification.

While the general method of synthesis described herein is satisfactory for the preparation of the compounds which comprise the novel compositions of matter of the present invention, I do not wish to be limited to these preparational procedures and therefore any other appropriate synthesis may be utilized. Thus, for example, it appears feasible to prepare the desired products by the reaction of the acid halide of a dicycloalkyl or arylcycloalkyl-substituted acetic acid with the appropriate hydroxylamine derivative such as a substituted aminoalkoxyamine of the general formula:

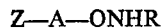

where the terms Z, A and R have the same meaning as hereinbefore set forth. When it is desired to have an α-hydroxyl group in the substituted acetic acid moiety of the product, one may start with the acid halide of an α-halo or α-acetoxy-substituted acetic acid of the type hereinbefore set forth and subsequently hydrolyze these groups to hydroxyl. The reaction may be carried out in an inert solvent of the type hereinbefore set forth and, if so desired, in the presence of a tertiary amine such as pyridine, triethylamine or tributylamine as an acceptor for the hydrogen chloride liberated.

The non-toxic acid addition salts of the compounds of this invention may be prepared by contacting the corresponding free base with a suitable mineral or organic acid such as hydrochloric, hydrobromic, sulfuric, phosphoric, tartaric, citric, maleic, fumaric, oxalic, succinic, benzoic, etc. The quaternary salts may be readily prepared by reacting the corresponding free base with a lower alkyl halide, sulfate or toluene sulfonate according to well-known procedures. Both the acid addition salts and the alkyl quaternary ammonium salts of the free base may be formulated into suitable pharmaceutical forms such as tablets or capsules for oral administration or solutions for parenteral administration for therapeutic use in animals or humans.

Examples of substituted amino alkyl esters of the substituted acetohydroxamic acid of this invention include 2-dimethylaminoethyl cyclopentylphenylacetohydroxamate,
2-dimethylaminoethyl cyclopentyl-p-methoxyphenylacetohydroxamate,
2-dimethylaminoethyl cyclohexylphenylacetohydroxamate,
2-dimethylaminoethyl dicyclohexylacetohydroxamate,
2-dimethylaminoethyl-α-hydroxy-cyclopentylphenylacetohydroxamate,
2-diethylaminoethyl dicyclopentylacetohydroxamate,
2-diethylaminoethyl cyclohexylphenylacetohydroxamate,
2-diethylaminoethyl dicyclohexylacetohydroxamate,
2-diethylaminoethyl-α-hydroxydicyclohexylacetohydroxamate,
3-dimethylaminopropyl cyclopentylphenylacetohydroxamate,
2-piperidinoethyl dicyclohexylacetohydroxamate,
3-pyrrolidinopropyl cyclohexylphenylacetohydroxamate,
2-morpholinoethyl α-hydroxydicyclohexylacetohydroxamate,
2-(N-methylpiperidyl-2)ethyl cyclopentylphenylacetohydroxamate, etc.

It is to be understood that the aforementioned compounds are only representative of the novel compositions of matter which may be prepared and that the present invention is not necessarily limited thereto.

The following examples are given to illustrate the process of the present invention which, however, are not intended to limit the generally broad scope of the present invention in strict accordance therewith.

EXAMPLE I

In this example, 47.8 g. (0.2 moles) of dicyclohexylacetohydroxamic acid are added to 0.45 moles of a 10% aqueous potassium hydroxide solution and an aqueous solution of 0.25 moles of 2-chloro-N,N-diethylethylaminohydrochloride is then slowly added with constant stirring, the temperature of the reaction being maintained in a range of from about 25° to about 30° C. The separated product of the reaction is then redissolved in 10% sulfuric acid and any undissolved material is removed and discarded. Sufficient potassium carbonate is then added to the aqueous acid solution so that the pH of the mixture is raised to a range of from about 9 to 10. The liberated 2-diethylaminoethyl dicyclohexylacetohydroxamate is separated and may be purified by crytallization from a suitable solvent or alternatively is converted to a crystalline salt of a non-toxic acid of the type hereinbefore specified and then purified.

EXAMPLE II

In this example, 2-diethylaminoethyl dicyclohexylacetohydroxamate is dissolved in a suitable solvent such as methanol after which an excess of methyliodide is added. The reaction is allowed to proceed at room temperature and the product is then isolated and recrystallized to constant melting point to give the desired methiodide quaternary salt. The methobromide quarternary salt is prepared in a similar manner using methylbromide in place of methyl iodide.

EXAMPLE III

The general procedure of Example I is repeated except that an equimolar amount of α-hydroxy-dicyclohexylacetohydroxamic acid is employed instead of dicyclohexylacetohydroxamic acid to produce 2-diethylaminoethyl α-hydroxydicyclohexylacetohydroxamate.

The free base is then converted to the hydrochloric acid salt in suitable solvent by the addition of anhydrous hydrogen chloride. The methobromide quarternary salt is produced from the free base by the action of methylbromide.

EXAMPLE IV

The general procedure of Example I is repeated except that an equimolar amount of 3-chloro-N,N-dimethylpropylamine hydrochloride is substituted for 2-chloro-N,N-diethylethylamine hydrochloride to produce 3-dimethylaminopropyl dicyclohexylacetohydroxamate.

EXAMPLE V

The general procedure of Example I is repeated except that an equimolar amount of 2-chloro-1-(N-methylpiperidyl-2)ethane hydrochloride is substituted for 2-chloro- N,N-diethylethylamine hydrochloride to produce 2-(N-methylpiperidyl-2)ethyl dicyclohexylacetohydroxamate.

EXAMPLE VI

The procedure of Example I is repeated except that an equimolar amount of α-hydroxycyclopentylphenylacetohydroxamic acid is substituted for dicyclohexylacetohydroxamic acid to produce 2-diethylaminoethyl α-hydroxycyclopentylphenylacetohydroxamate.

I claim as my invention:

1. A compound of the class of the class consisting of a free base, its addition salts with non-toxic acids and lower alkyl quaternary ammonium salts, said free base having the formula:

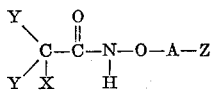

in which Y is selected from the group consisting of phenyl, lower alkylphenyl, lower alkoxy-phenyl and $C_5$ or $C_6$ cycloalkyl radicals, at least one Y being cycloalkyl, X is selected from the group consisting of hydrogen and hydroxyl, A is alkylene of from 2 to about 5 carbon atoms and Z is selected from the group consisting of di-lower alkyl)-amino, piperidino, N-methyl piperidyl, pyrrolidino and morpholino radicals.

2. A compound as set forth in claim 1, the free base being 2-diethylaminoethyl dicyclohexylacetohydroxamate.

3. A compound as set forth in claim 1, the free base being 2-(N-methylpiperidyl-2)ethyl dicyclohexylacetohydroxamate.

4. A compound as set forth in claim 1, the free base being 2-diethylaminoethyl α-hydroxydicyclohexylacetohydroxamate.

5. A compound as set forth in claim 1, the free base being 2-diethylaminoethyl α-hydroxycyclopentylphenylacetohydroxamate.

6. A compound as set forth in claim 1, the free base being 3-dimethylaminopropyl dicyclohexylacetohydroxamate.

References Cited

UNITED STATES PATENTS 3,183,255  5/1965  Levy _____ 260—453
3,230,227  1/1966  Levy _____ 260—294
3,268,539  8/1966  Levy _____ 260—294

HENRY R. JILES, Primary Examiner

G. T. TODD, Assistant Examiner

U.S. Cl. X.R.

260—247.2, 326.3, 453, 500.5, 999